(12) United States Patent
Liu et al.

(10) Patent No.: US 8,832,673 B2
(45) Date of Patent: Sep. 9, 2014

(54) NON-INTRUSIVELY ADAPTING EXISTING PORTFOLIO OPTIMIZER FOR VALUATED DEPENDENCIES

(75) Inventors: Ying Liu, Beijing (CN); Fan Jing Meng, Beijing (CN); Dharmashankar Subramanian, Stamford, CT (US); Clay E. Williams, New York, NY (US); Shun Xiang Yang, Beijing (CN); Xin Zhou, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 559 days.

(21) Appl. No.: 13/153,030

(22) Filed: Jun. 3, 2011

(65) Prior Publication Data

US 2012/0311549 A1 Dec. 6, 2012

(51) Int. Cl.
*G06F 9/45* (2006.01)
*G06Q 40/06* (2012.01)

(52) U.S. Cl.
CPC ................................. *G06Q 40/06* (2013.01)
USPC ........................................................ 717/151

(58) Field of Classification Search
CPC .................................................... G06Q 40/06
USPC ................................................. 717/151–161
See application file for complete search history.

(56) References Cited

PUBLICATIONS

Dillon et al., "A Unified Optimization Framework for Robust Pseudo-relevance Feedback Algorithms", Oct. 2010, ACM, in CIKM'10, Toronto, Ontario, Canada, 10 pages.*
Aubin et al., "History Path Dependent Optimal Control and Portfolio Valuation and Management", 2002, Kluwer Academic Publishers, Netherlands, pp. 331-358.*
Carlshamre et al., An Industrial Survey of Requirements Interdependencies in Software Product Release Plannin, Fifth IEEE International Symposium on Requirements Engineering (RE'01), 2001, pp. 0084.
Ruhe et al., The Art and Science of Software Release Planning, IEEE Software, 2005, pp. 47-53, vol. 22. No. 6.
Svahnberg et al, A systematic review on strategic release planning models, 2009.
Ngo-The et al, Fuzzy Structural. Dependency Constraints in Software Release Planning, Proceedings of the 14h IEEE International Conference on Fuzzy Systems, 2005, pp. 442-447 (abstract).

\* cited by examiner

*Primary Examiner* — Ted T Vo
(74) *Attorney, Agent, or Firm* — Scully, Scott, Murphy & Presser, P.C.; Louis J. Percello, Esq.

(57) ABSTRACT

Adapting an existing portfolio optimizer to support one or more valuated dependencies without modifying the existing portfolio optimizer, may include translating one or more original elements and associated dependencies in a portfolio to be optimized based on said one or more valuated dependencies; invoking the existing portfolio optimizer with the translated one or more original elements and associated dependencies; and translating optimization results, if said optimization results contain translated one or more original elements, into a solution characterized in terms of said one or more original elements.

22 Claims, 10 Drawing Sheets

US 8,832,673 B2

NON-INTRUSIVELY ADAPTING EXISTING PORTFOLIO OPTIMIZER FOR VALUATED DEPENDENCIES

FIELD

The present application relates generally to computers, and programming development and analysis, and more particularly to adapting existing portfolio optimizer for valuated dependencies.

BACKGROUND

Portfolio is a collection of things. For example, there are project portfolio, application portfolio, asset portfolio, investment portfolio, and others. Portfolio optimization selects portfolio elements to construct a solution that best achieves one or more quantitative objectives and to satisfy the required quantitative and inter-dependency constraints. Quantitative objectives and quantitative constraints are calculated based on portfolio element's attribute measurements. For example, investment oriented portfolio optimization determines an optimal investment ($X) on proposals ($Y, Y>>X) to best achieve the portfolio's economic measures considering proposal attributes including cost, consumption of resources, benefits, and inter-dependencies, and others.

Inter-dependencies can be logical dependencies or valuated dependencies. Logical dependency can be expressed as "require" or "exclude" types. For instance, "element A requires B" means that if A is selected, then B should also be selected; "element A excludes B" means that A and B cannot be selected together.

Valuated dependency is a kind of dependency among elements that will change the number of one or multiple involved elements' attributes. Valuated dependency may be further broken down into different types: for example, resource valuated dependency (RVD) which is explained as follows—suppose developing component A requires 30 person days, developing component B requires 40 person days, if there is a −10% RVD from A to B, then when A and B are developed together, the total resource consumption should be 30*(1-10%)+40=67 person days; duration valuated dependency (DVD) may be explained as follows—suppose developing component A requires working 20 days, developing component B requires 15 working days, if there is a +10% DVD from A to B, then when A and B are developed together, the total duration should be 20*(1+10%)+15=37 working days; benefit valuated dependency (BVD) may be explained as follows—suppose product A can bring benefit of 40,000 dollars after delivery, product B can bring benefit of 25,000 dollars after delivery, if there is a +10% BVD from A to B, then when A and B are delivered together, their total benefit should be 40,000*(1+10%)+25,000=69,000 dollars.

While the current portfolio optimization approaches may consider logical dependencies, they seldom consider valuated dependencies. A typical approach to enhancing existing portfolio optimization approaches that support logical dependencies to also support valuated dependencies, has been to modify the existing portfolio optimizer. However, such an approach poses several challenges: the complexity of understanding existing optimizer code, the complexity of cautious design for adding code to existing base, the risk of involving defects to original functions by dispersed modification on existing base, and the efforts and risk growing with increased valuated dependency types to be considered.

BRIEF SUMMARY

A method for adapting an existing portfolio optimizer to support one or more valuated dependencies without modifying the existing portfolio optimizer, in one aspect, may include translating one or more original elements and associated dependencies in a portfolio to be optimized based on said one or more valuated dependencies and invoking the existing portfolio optimizer with the translated one or more original elements and associated dependencies. The method may also include translating optimization results, if said optimization results contain translated one or more original elements, into a solution characterized in terms of said one or more original elements.

A system for adapting an existing portfolio optimizer to support one or more valuated dependencies without modifying the existing portfolio optimizer, in one aspect, may include a module operable to execute on the processor and further operable to translate one or more original elements and associated dependencies in a portfolio to be optimized based on said one or more valuated dependencies. The module may be further operable to invoke the existing portfolio optimizer with the translated one or more original elements and associated dependencies. The module may be also operable to translate optimization results, if said optimization results contain translated one or more original elements, into a solution characterized in terms of said one or more original elements.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

Methodologies for adapting an existing portfolio optimizer to support valuated dependencies, for instance, non-intrusively, are presented. In one aspect, a methodology of the present disclosure may translate original elements and dependencies based on the valuated dependencies, invoke original optimizer with the translated input and translate optimization result back to the original elements.

Figure 1:
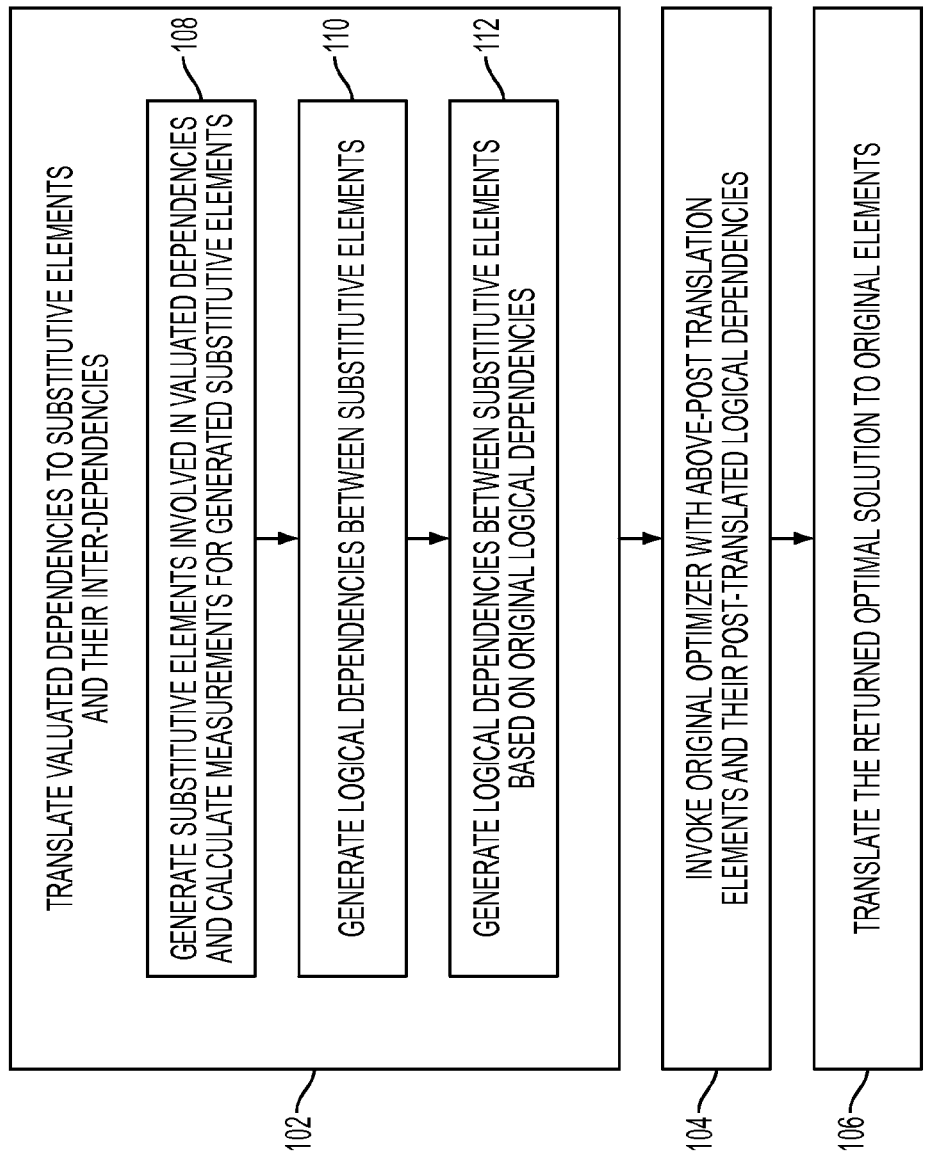
FIG. 1 is a flow diagram illustrating a method for adapting an existing portfolio optimizer to support valuated dependencies in one embodiment of the present disclosure.

FIG. 1 is a flow diagram illustrating a method for adapting an existing portfolio optimizer to support valuated dependencies in one embodiment of the present disclosure. At 102, valuated dependencies between portfolio elements may be translated to substitutive elements and their inter-dependencies. An element in a portfolio may be any project, an approach or methodology, a proposal, an asset, or a product, that may be a candidate for optimization for example, by a portfolio optimizer or such optimization technique. In one embodiment of the present disclosure, this translation at 102 may include generating substitutive elements for elements involved in valuated dependencies and computing measurements or attribute values for the generated substitutive elements as shown at 108. Substitutive elements may be built to include all combinations of those original elements that have valuated dependencies. Measurements or attribute values may be calculated for each of the generated substitutive element, for instance, by using a weighted formula that takes into account the valuated dependency values. Details of this step with an example scenario are described with reference to FIG. 5. The translation of 102 may also include generating logical dependencies between substitutive elements as shown at 110. For example, if substitutive element A and substitutive element B include one or multiple common constituent original elements, there should be an "exclude" dependency between substitutive element A and substitutive element B. The translation of 102 may further include generating logical dependencies between substitutive elements based on original logical dependencies as shown at 112. Details of steps 110 and 112 in conjunction with an example scenario are described with reference to FIGS. 6 and 7.

At 104, an optimizer may be invoked with the translated elements (substitutive elements and original elements), their associated dependencies and attribute values, objective to be achieved with associated constraints. Details of step 104 are described with an example scenario in reference to FIG. 8. The optimizer may return a solution that includes substitutive elements. Therefore, at 106, the solution may be translated back to original elements, for example, so that the solution is characterized in terms of the original elements. Details of step 106 are described with an example scenario in reference to FIGS. 9 and 10.

Figure 2:
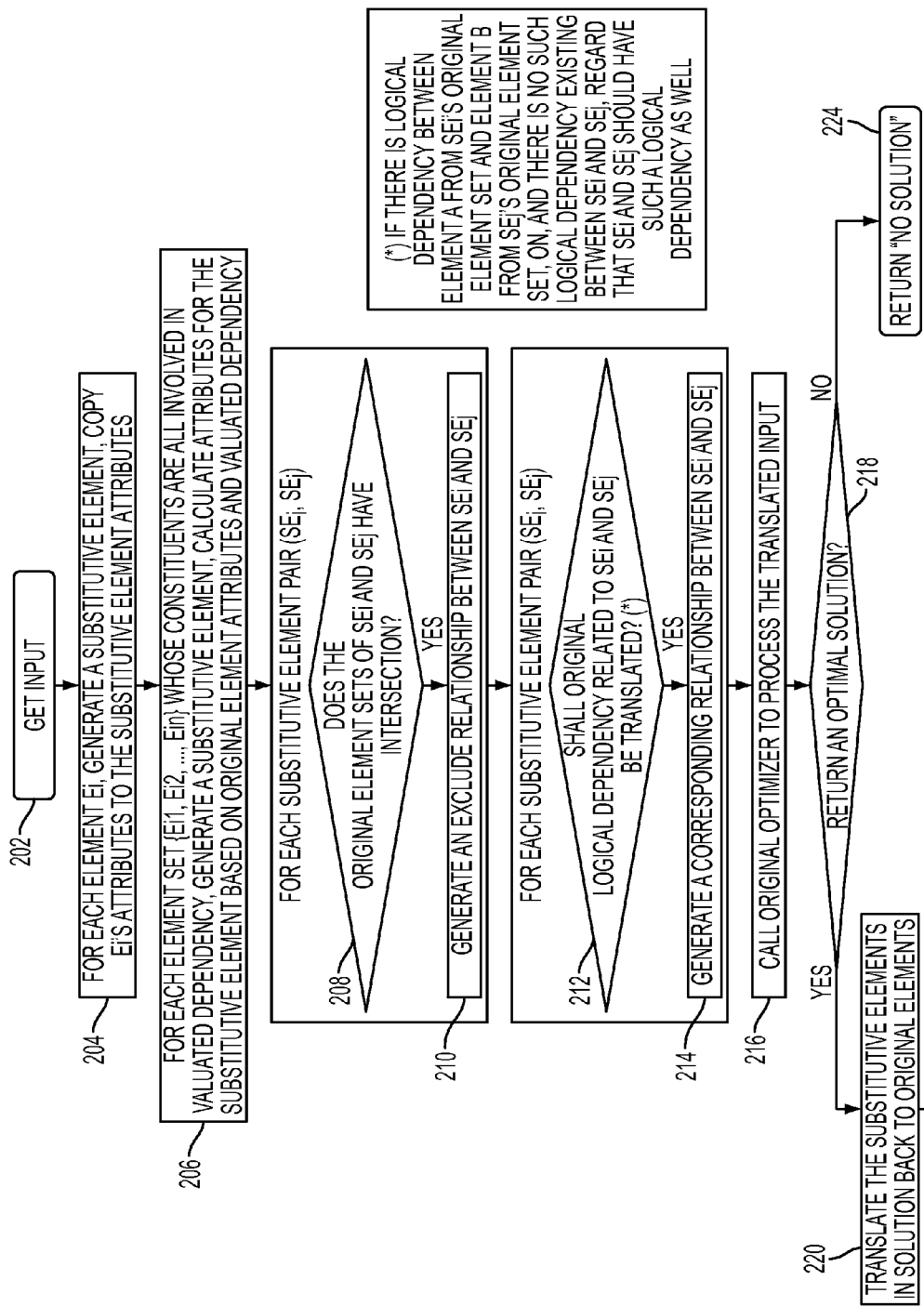
FIG. 2 is a flow diagram illustrating details of a method for adapting an existing portfolio optimizer to support valuated dependencies in one embodiment of the present disclosure.

FIG. 2 is a flow diagram illustrating details of a method for adapting an existing portfolio optimizer to support valuated dependencies in one embodiment of the present disclosure. At 202, input is received. The input in one embodiment may include a plurality of portfolio elements ($E_i$), their attribute and values (also referred to as measurements), logical dependencies if any, and valuated dependencies. The input also may include an objective for optimization and associated constraints subject to which an objective function may be solved.

At 204, for each element $E_i$, a substitutive element is generated, and corresponding attributes and values are copied to the generated substitutive element's attributes. At 206, for each element set $\{E_{i1}, E_{i2}, \ldots, E_{in}\}$ whose constituents (members) are involved in valuated dependency, a substitutive element is generated, and attributes for the substitutive elements are generated based on the original element attributes and one or more valuated dependencies.

At 208, it is determined for each substitutive element pair ($SE_i$, $SE_j$), whether the original element sets of $SE_i$ and $SE_j$ have intersection. If there is intersection of elements between the substitutive pair, at 210 an "exclude" relationship is generated between $SE_i$ and $SE_j$.

At 212, it is determined for each substitutive element pair ($SE_i$, $SE_j$), whether original logical dependency related to $SE_i$ and $SE_j$ should be translated. For instance, if there is logical dependency between element A from $SE_i$'s original element set and element B from $SE_j$'s original element set, and there is no such logical dependency existing between $SE_i$ and $SE_j$, then $SE_i$ and $SE_j$ should have such logical dependency as well. At 214, if it is determined that logical dependency should exist between a substitutive element pair, a corresponding relationship is generated between $SE_i$ and $SE_j$.

At 216, an optimizer is invoked to process the translated input, for example, translated according to the above described steps. At 218, it is determined whether the optimizer returned an optimal solution. If the optimizer returned a solution, and the solution includes one or more substitutive elements, one or more of the substitutive elements in the solution are translated back to original elements at 220. At 222, the solution containing the original elements is returned. On the other hand, if the optimizer does not return a solution at 218, a message that no solution was generated may be returned at 224.

Figure 3:
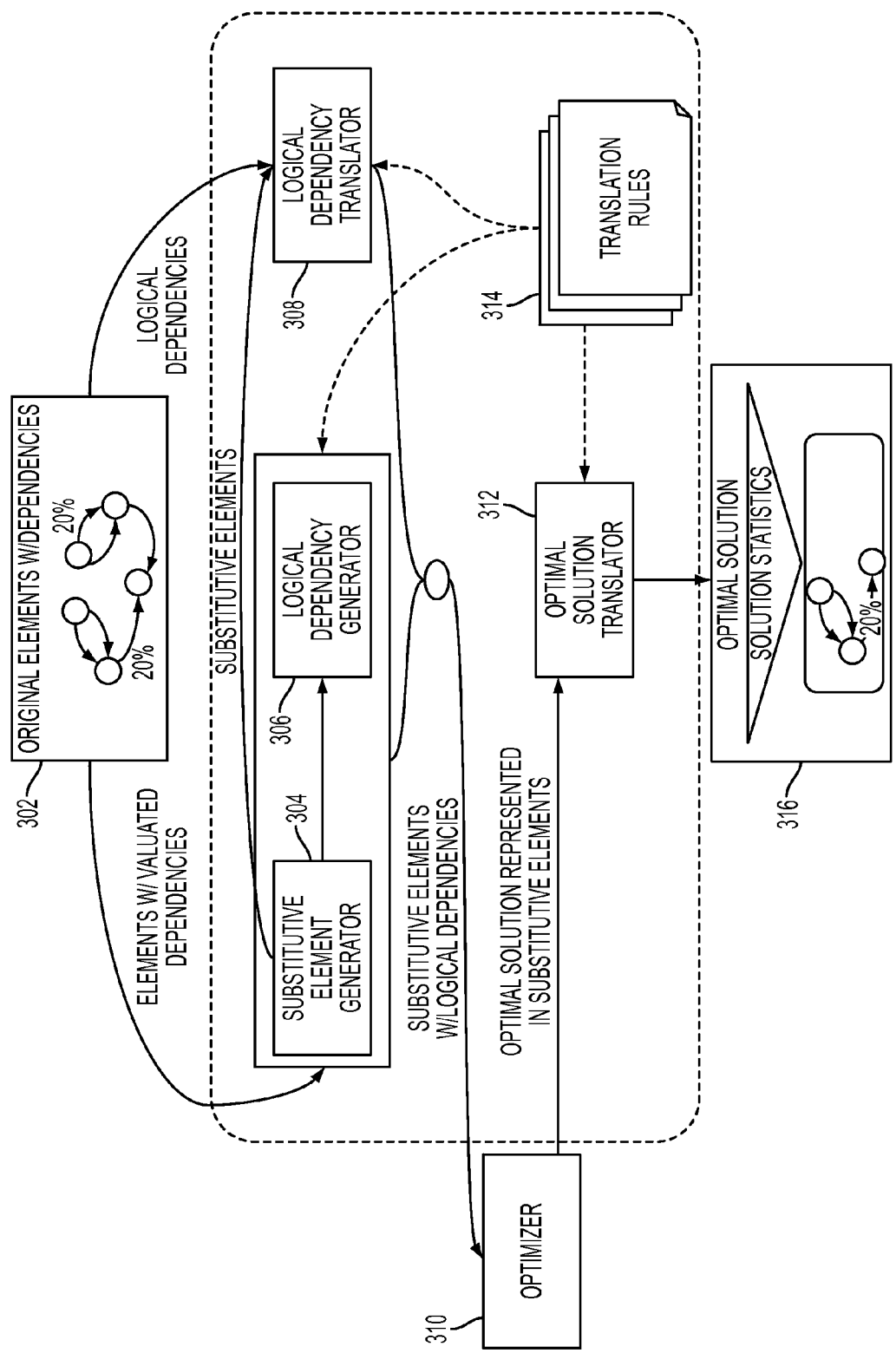
FIG. 3 is a diagram illustrating a system for adapting an existing portfolio optimizer to support valuated dependencies in one embodiment of the present disclosure.

FIG. 3 is a diagram illustrating a system for adapting an existing portfolio optimizer to support valuated dependencies in one embodiment of the present disclosure. A substitutive element generator 304, in one embodiment, may be a module or circuit operator to run on a processor, and may generate one or more substitutive elements based on original elements with their associated one or more dependencies 302, for example, one or more valuated dependencies. A logical dependency generator 306 may be a module or circuit operator to run on a processor, and may generate one or more logical dependencies between the generated substitutive elements. For instance, the logical dependency generator 306 may generate "exclude" logical dependencies between substitutive elements that have constituent (member) elements in common. A logical dependency translator 308 may be a module or circuit operable to run on a processor, and may generate one or more logical dependencies between substitutive elements based on the original logical dependencies among their constituent (member) elements. For example, logical dependencies such as "require" dependencies existing in the original elements 302 are also generated for the substitutive elements that have members or constituents that include those original elements.

The substitutive elements generated by the substitutive element generator 304, with their logical dependencies (e.g., built by the logical dependency generator 306 and the logical dependency translator 308) are then input to a portfolio optimizer. Briefly, a portfolio optimizer 310 may be an optimization tool that takes an objective function with associated constraints to generate an optimal solution. In one aspect, the optimizer 310 may be a third party optimizer. An optimal solution translator 312 may translate a solution that includes substitutive elements into a solution that includes the original elements, for instance, using or based on one or more translation rules 314. For example, if an original element is the constituent element of a substitutive element in the optimal solution, this original element should be included in the post-translated solution. The solution 316 that is characterized in terms of the original elements then may be provided or presented or returned.

Figure 4:
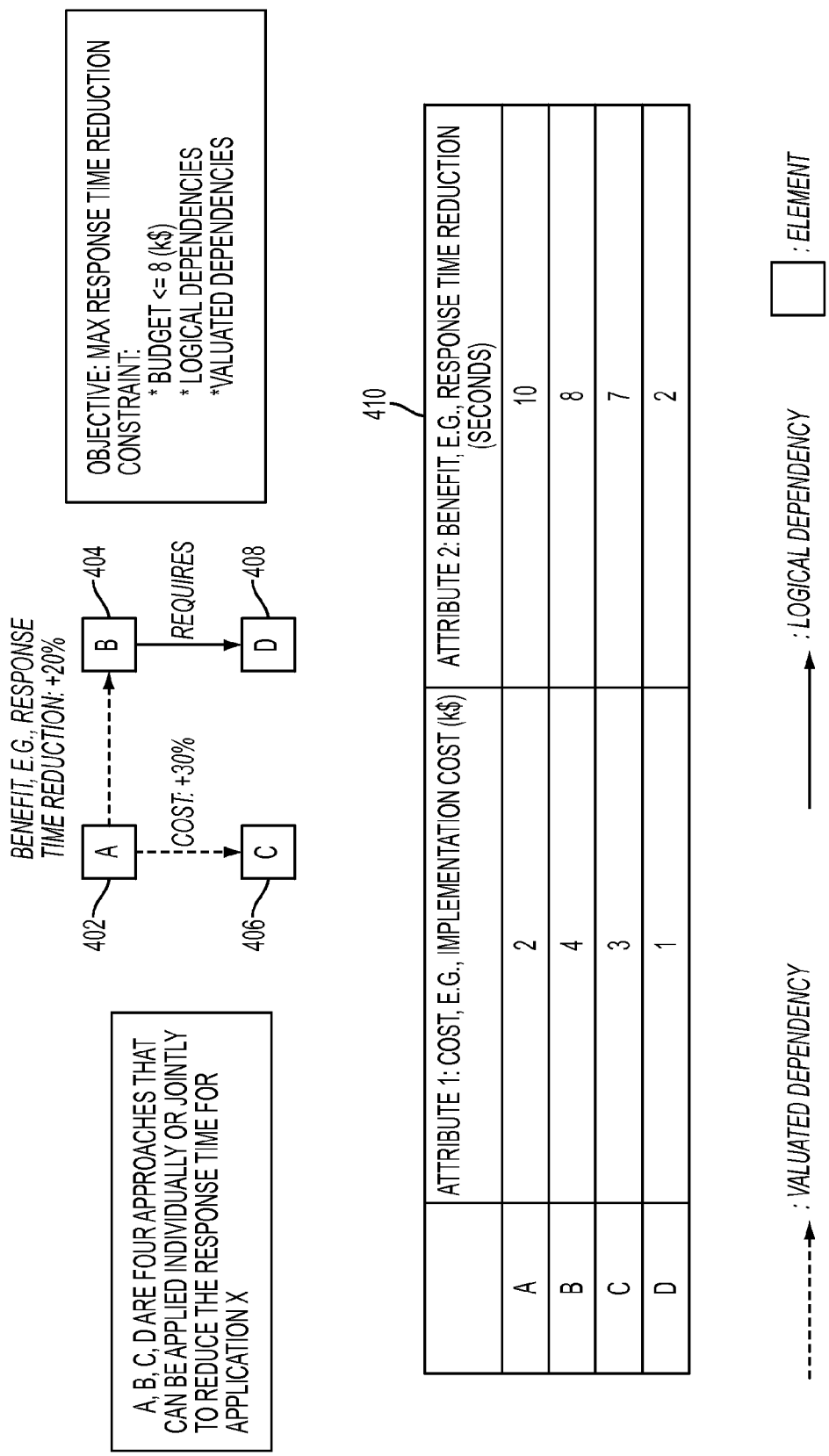
FIG. 4 is a diagram showing an example of initial input in the process for adapting an existing portfolio optimizer to support valuated dependencies in one embodiment of the present disclosure.

FIG. 4 is a diagram showing an example of initial input in the process for adapting an existing portfolio optimizer to support valuated dependencies in one embodiment of the present disclosure. Initial input in this example includes four elements, A 402, B 404, C 406 and D 408, referred to herein as original elements. The inter-dependencies between them include: a benefit dependency of +20% from A 402 to B 404, which means that if A 402 and B 404 are considered together, A's benefit will increase by 20%; A cost dependency of +30% from A 402 to C 406, which means that if A 402 and C 406 are considered together, A's cost will increase by 30%; a required dependency from B 404 to D 408, which means that if B 404 is considered, D 408 must be considered also. Examples of elements A, B, C and D may be different project proposals that are being considered for funding. So, for example, if A and B are funded together, A's benefit may increase by 20% according to the benefit dependency; if A and C are funded together, A's cost will increase by 30% according to the cost dependency; if B is funded then D must be funded as well according to the "required" dependency. As another example, elements A, B, C and D may be different approaches that can be applied individually or jointly to reduce the response time for application X. Thus, for example, if A and B are implemented together, a benefit (e.g., response time reduction) of 20% may be realized according to the benefit dependency in this example; if A and C are implemented together, there will be an increase of 30% in A's cost according to the cost dependency in this example; and if B is implemented D must be implemented too, according to the require dependency. Note, the benefit and cost dependencies are examples of valuated dependencies; require dependency is an example of logical dependency.

The following description explains the methodologies of the present disclosure in one embodiment with elements A, B, C and D as example approaches to reducing the response time for application X. However, it should be understood that the present disclosure does not limit the methodologies to only that particular scenario. Rather, the elements may represent any other entities that can utilize portfolio optimization.

The initial input also may include an objective for optimization, e.g., maximum response time reduction, and constraints which the optimization is subject to, e.g., budget<=8 k, one or more logical dependencies and one or more valuated dependencies.

The table 410 shows the measurements or attributes associated with each of the elements (A 402, B 404, C 406, D 408). For instance, in this example, the cost for implementing A 402 is 2 k, the benefit realized is 10 seconds in response time reduction of application X; the cost for implementing B 404 is 4 k, the benefit realized is 8 seconds in response time reduction of application X; the cost for implementing C 406 is 3 k, the benefit realized is 7 seconds in response time reduction of application X; the cost for implementing D 408 is 1 k, the benefit realized is 2 seconds in response time reduction of application X.

Figure 5:
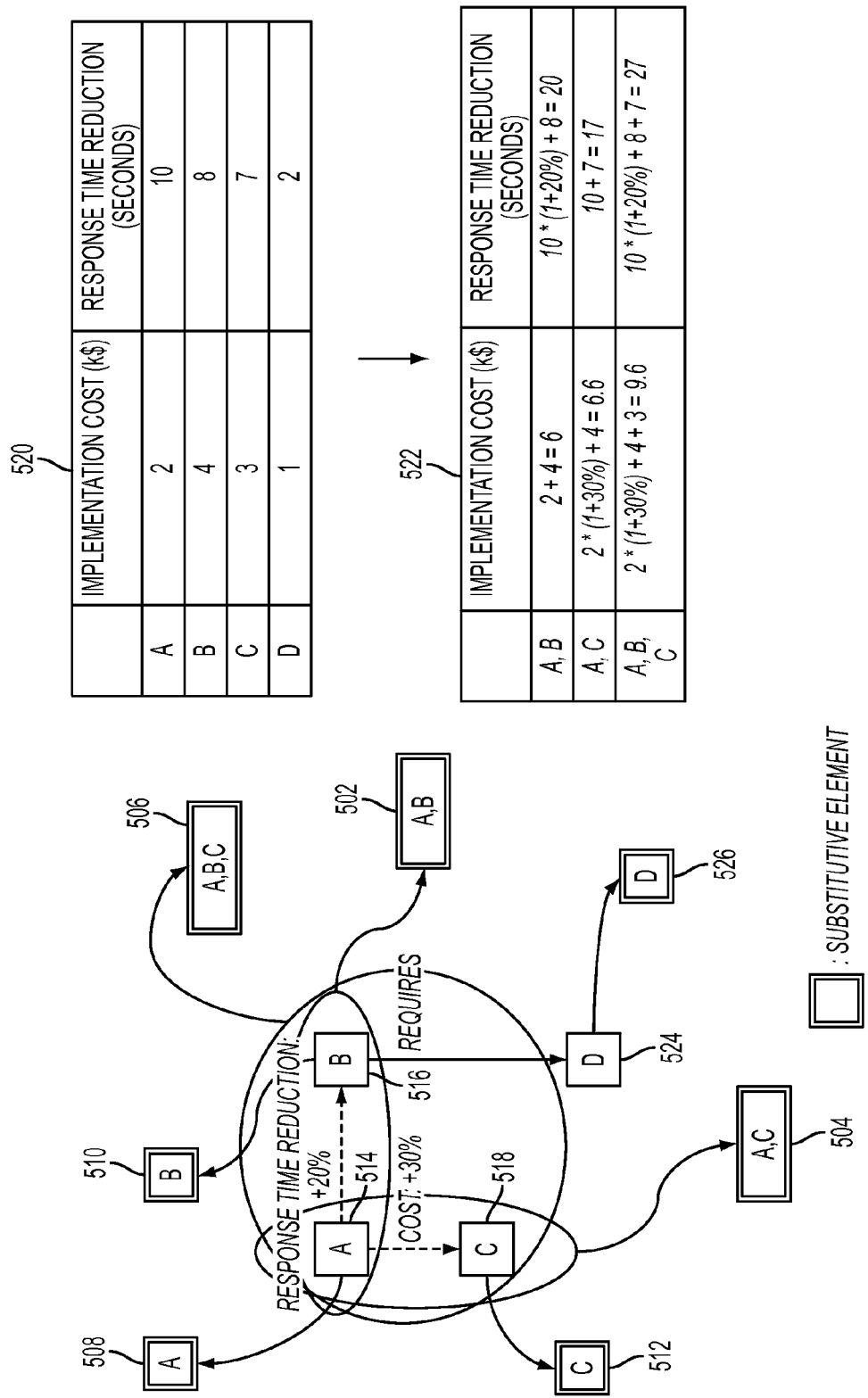
FIG. 5 is a diagram showing an example of generating substitutive elements in the process for adapting an existing portfolio optimizer to support valuated dependencies in one embodiment of the present disclosure.

FIG. 5 is a diagram showing an example of generating substitutive elements in the process for adapting an existing portfolio optimizer to support valuated dependencies in one embodiment of the present disclosure. In one embodiment of the methodology of the present disclosure, substitute (or substitutive) elements are generated based on the original elements and their valuated dependencies. For instance, the original elements having dependency relationship are grouped as substitutive elements. Continuing with the example elements shown in FIG. 4, substitutive element (A, B) 502 is generated based on original element A and original element B's benefit dependency relationship; substitutive element (A, C) 504 is generated based on original element A and original element C's cost dependency relationship. Substitutive element (A, B, C) 506 is generated based on original element A and original element B's benefit dependency relationship and also based on original element A and original element C's cost dependency relationship.

In addition, the measurement or attribute are computed for the generated substitutive elements based on their valuated dependencies. Generally, the attribute values or measurements for substitutive elements are computed as the sum of the attribute values of the original elements that makes up a substitutive element, taking into consideration one or more of the valuated dependencies as weighted values in the sum. Table 522 shows the measurement element or attribute values of the substitutive elements. For instance, implementation cost for substitutive element (A,B) is computed as the sum of the implementation costs for A and B, since A and B do not have cost dependency between them in this example. However, between A and B, there exists benefit dependency of 20%. Thus the benefit (in this example, response time reduction) attribute value is computed as A's benefit multiplied by (1+benefit dependency)+B's benefit, in this example, 10*(1+20%)+8=20. Similarly, substitutive element (A, C) have cost dependency of +30%; thus, the implementation cost for this substitutive element is computed to be A's cost multiplied by (1+cost dependency)+C's cost, in this example, 2*(1+30%)+3=7.8. There is no benefit dependency between A and C, therefore, the benefit attribute value for substitutive element (A, C) is the sum of the benefit attributes values associated with the original elements A and C, in this example, 10+7=17. Substitutive element (A, B, C)'s cost attribute is computed as A's cost*(1+cost dependency)+B's cost attribute+C's cost attribute, in this example, 2*(1+30%)+4+3=9.6. Substitutive element (A, B, C)'s benefit attribute is computed as A's benefit*(1+benefit dependency)+B's benefit attribute+C's benefit attribute, in this example, 10*(1+20%)+8+7=27.

In one embodiment of the present disclosure, substitutive elements A 508, B 510 and C 512 and D526 may be respectively generated from original elements A 514, B 516 and C 518 and D524. Substitutive elements A, B, C, D's attribute values remain the same as their respective original elements, as shown at 520. In another embodiment, duplicates of the original elements need not be generated as substitutive elements; rather, the original elements may be utilized along with the original elements' attribute values.

Figure 6:
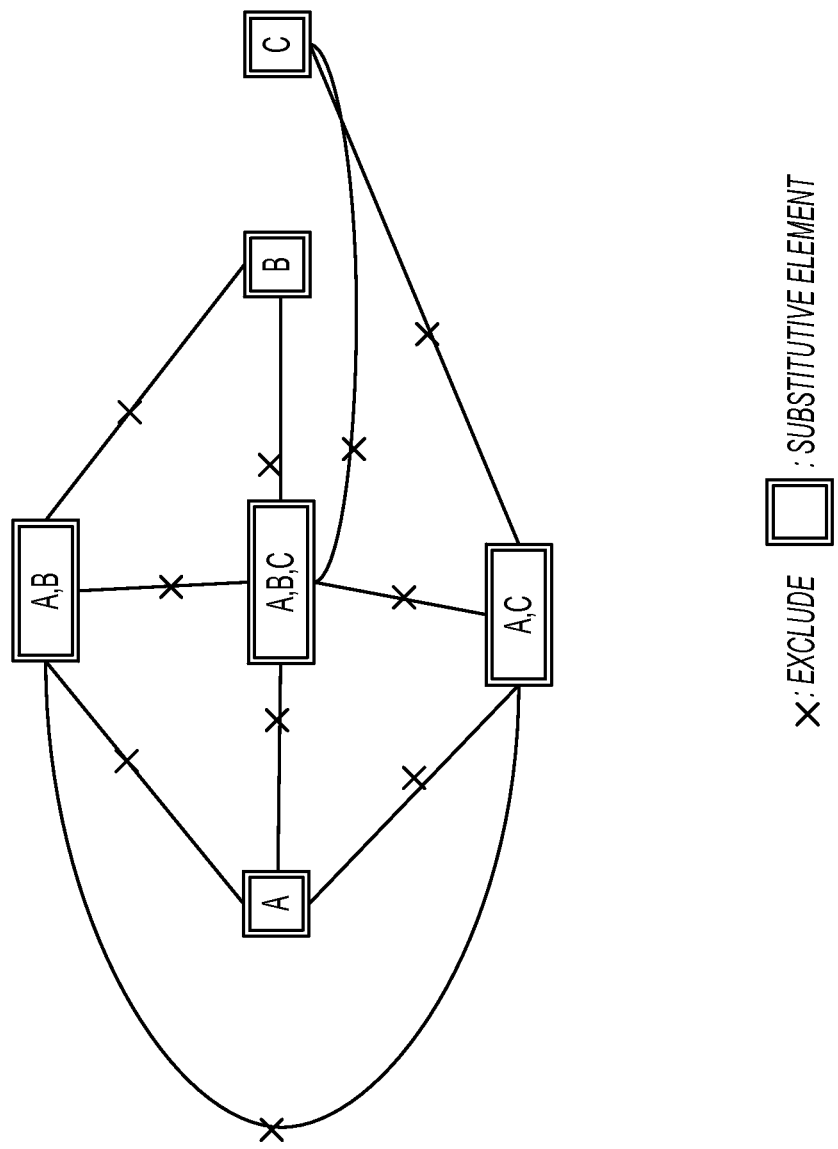
FIG. 6 is a diagram showing an example of generating logical dependencies in the process for adapting an existing portfolio optimizer to support valuated dependencies in one embodiment of the present disclosure.

FIG. 6 is a diagram showing an example of generating logical dependencies in the process for adapting an existing portfolio optimizer to support valuated dependencies in one embodiment of the present disclosure. Logical dependencies between the substitutive elements are generated. For instance, "exclude" dependencies are identified and generated between the substitutive elements that have overlapping constituent elements. For example, substitutive element (A) would have "exclude" dependency with substitutive element that also includes element A, in this example, (A, B), (A, B, C) and (A, C). Similarly, substitutive element (B) would have "exclude" dependency with substitutive element that also includes element B, in this example, (A, B) and (A, B, C). Likewise, substitutive element (C) would have "exclude" dependency with substitutive element that also includes element C, in this example, (A, C) and (A, B, C).

Figure 7:
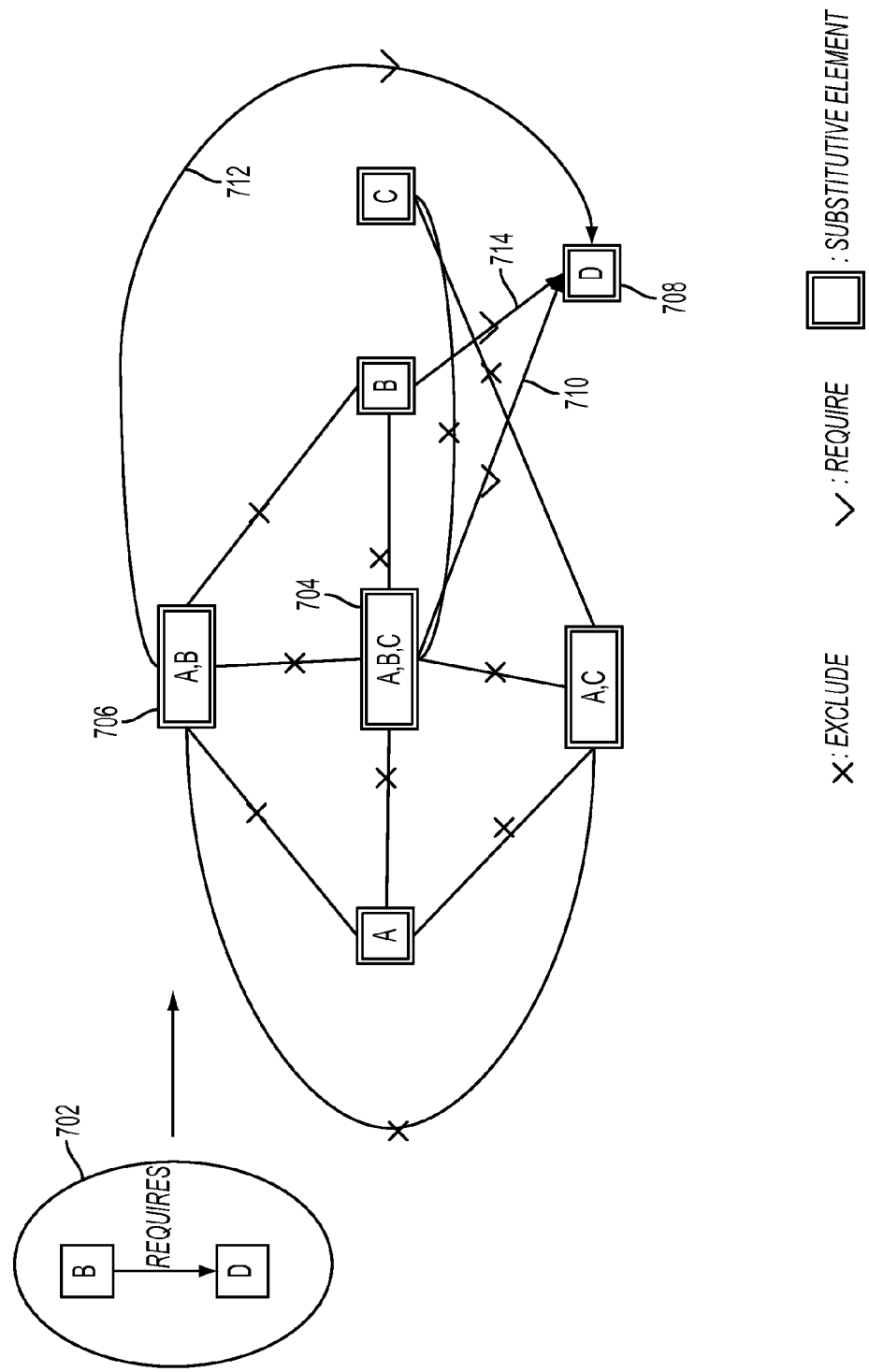
FIG. 7 is a diagram showing an example of translating logical dependencies in the process for adapting an existing portfolio optimizer to support valuated dependencies in one embodiment of the present disclosure.

FIG. 7 is a diagram showing an example of translating logical dependencies in the process for adapting an existing portfolio optimizer to support valuated dependencies in one embodiment of the present disclosure. Logical dependencies between substitutive elements based on original logical dependencies are generated. For instance, original "requires" and "excludes" dependencies among the original elements may be translated to generate logical dependencies between substitutive elements. For example, original "requires" dependency between original elements B and D (shown at 702) may be translated to include the same type of dependency between the substitutive elements whose member includes B or D. In this example, substitutive elements (A, B, C) 704 and (A, B) 706 include original element B, therefore, a "requires" dependency is generated between substitutive element (A, B, C) and element (D) 708 as shown by the line 710 connecting the two elements, and another "requires" dependency is generated between substitutive element (A, B) 706 and element (D) 708 as shown by the line 712 connecting those two elements. The "requires" dependency shown by the line 714 between element (B) and element (D) is the same as the originally input "requires" dependency between the original elements B and D.

Figure 8:
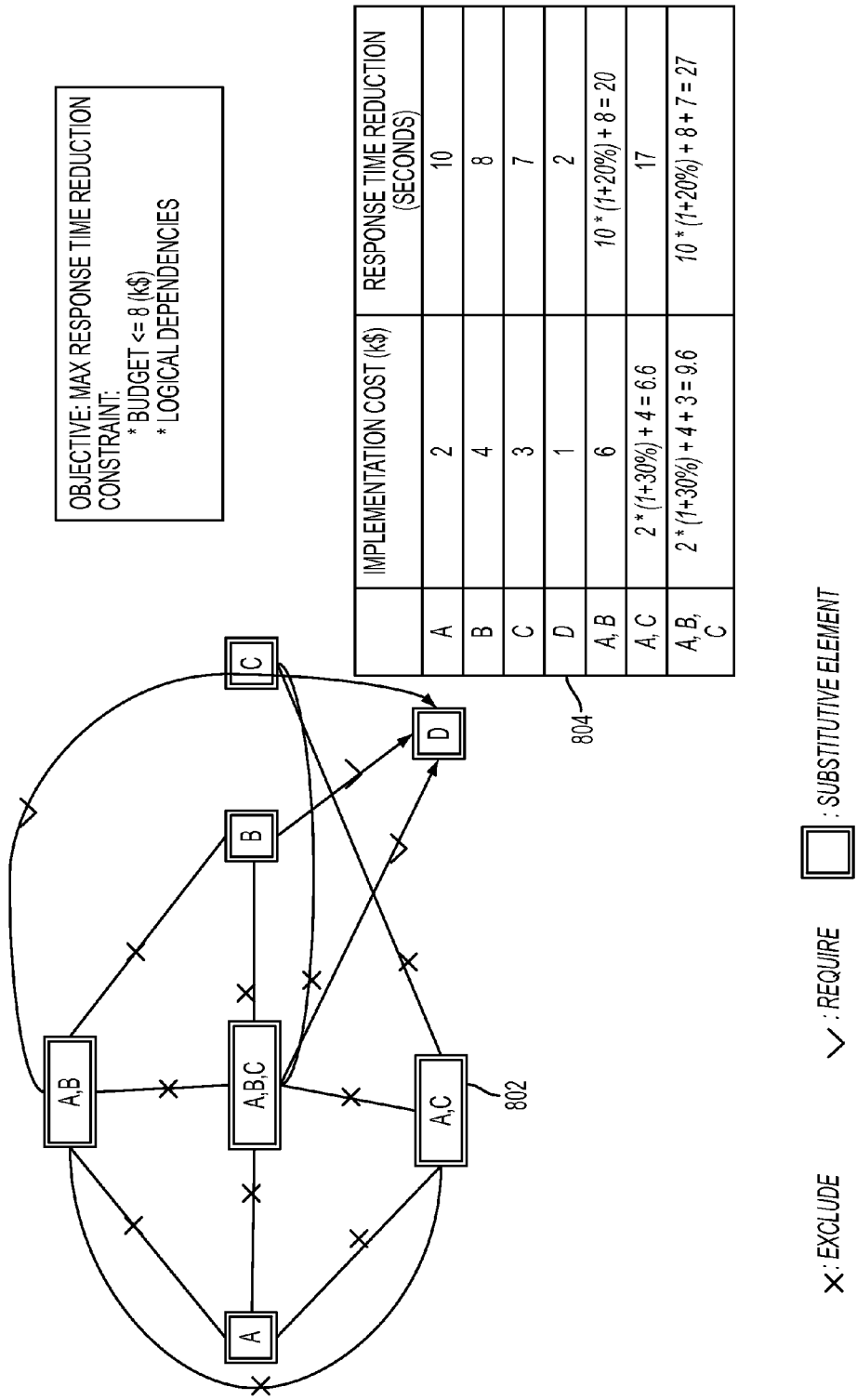
FIG. 8 is a diagram showing an example of inputting to an existing optimizer in the process for adapting an existing portfolio optimizer to support valuated dependencies in one embodiment of the present disclosure.

FIG. 8 is a diagram showing an example of inputting the generated substitutive elements and dependencies to an existing optimizer in the process for adapting an existing portfolio optimizer to support valuated dependencies in one embodiment of the present disclosure. The generated substitutive elements (along with original elements if the substitutive elements do not include the original elements), their associated attribute values, for example, generated as described above, and generated dependencies (along with original dependencies) are input to a portfolio optimizer. An objective for optimization with one or more constraints may be also input. In this example, an objective may be to maximize response time reduction subject to the constraints of budget<=8 k and the input logical dependencies. The generated substitutive elements, the original elements and the generated dependencies are graphically shown at 802. The generated attribute values are shown at 804 for each of the original and substitutive elements.

Figure 9:
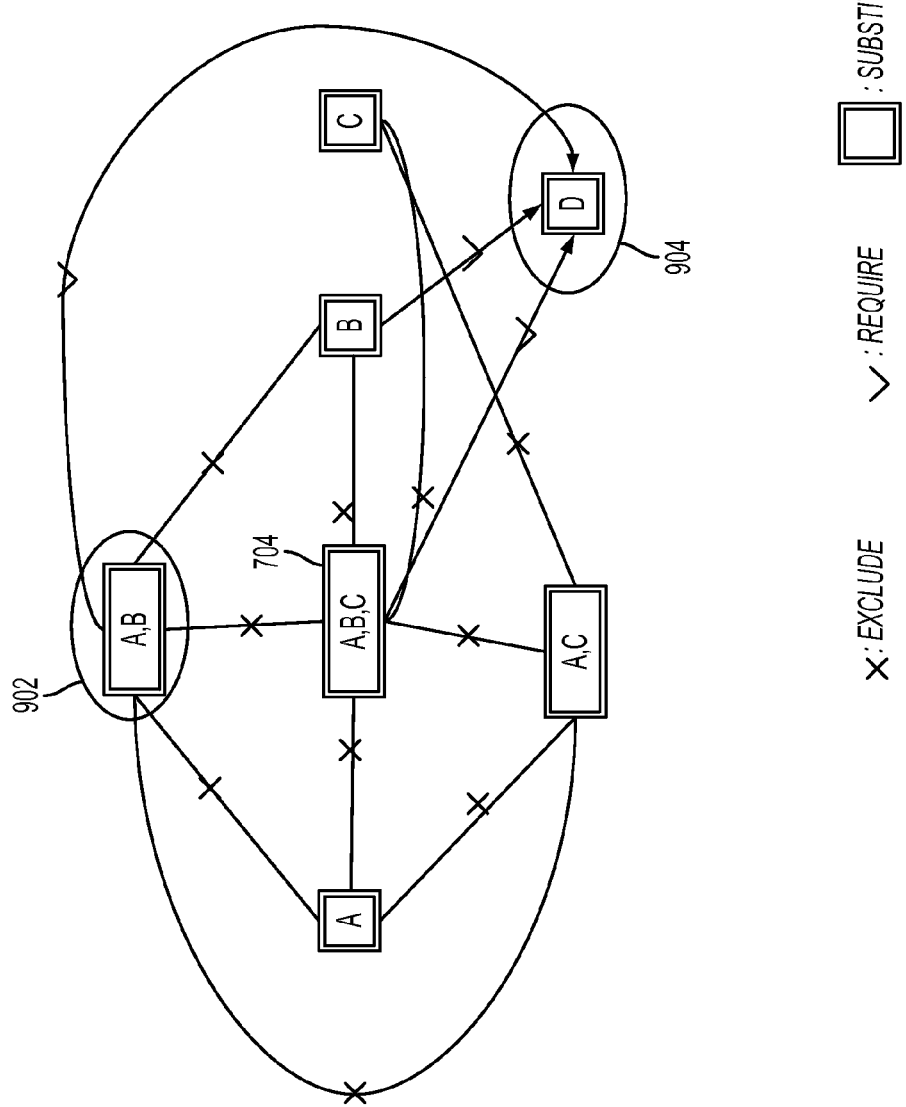
FIG. 9 is a diagram showing an example of an output from an existing optimizer in the process for adapting an existing portfolio optimizer to support valuated dependencies in one embodiment of the present disclosure.

FIG. 9 is a diagram showing an example of an output from an existing optimizer in the process for adapting an existing portfolio optimizer to support valuated dependencies in one embodiment of the present disclosure. For instance, the optimizer may output that based on the constraints the optimum combination of approaches may be implementing substitutive element (A, B) and element (D) as shown at 902 and 904.

Figure 10:
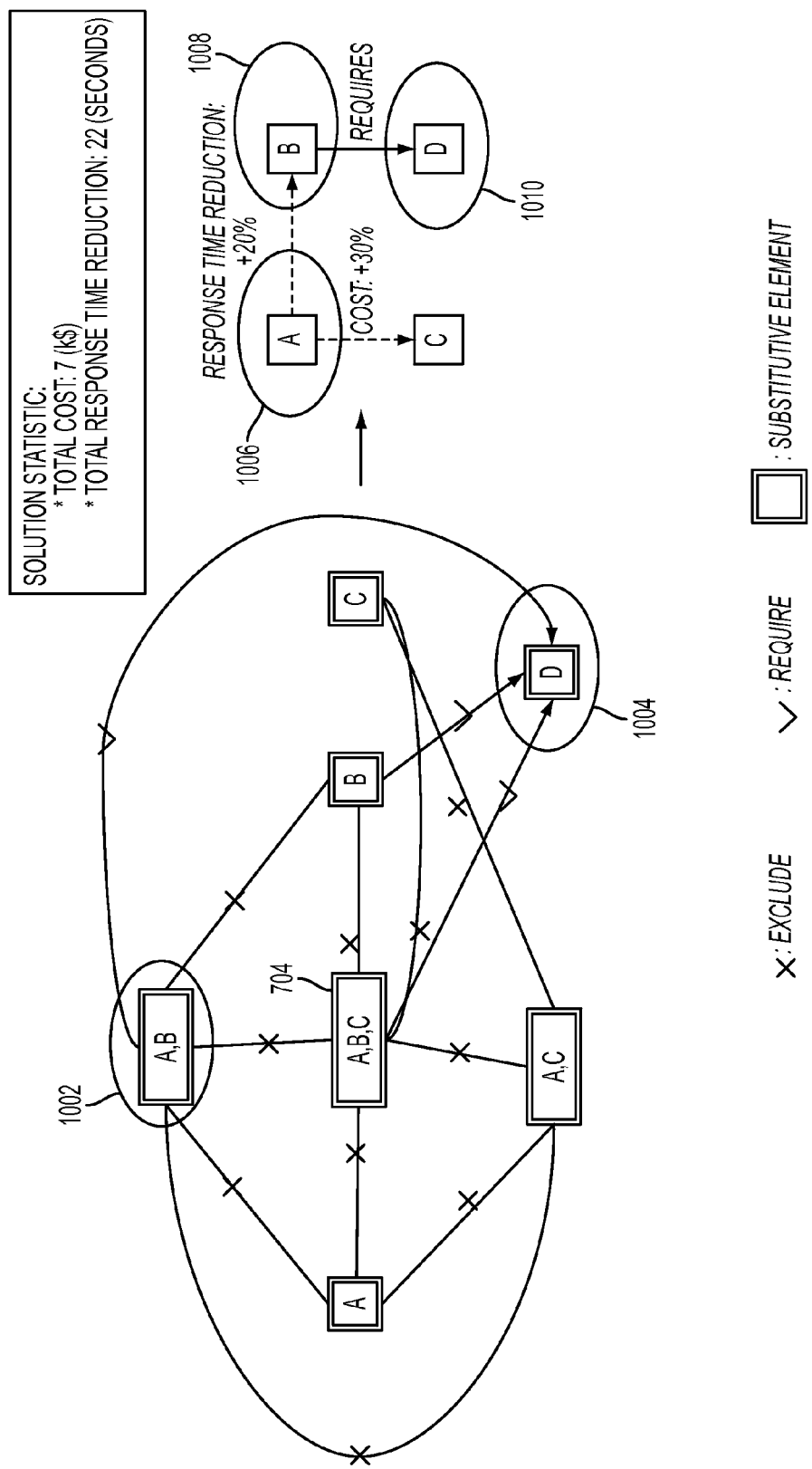
FIG. 10 is a diagram showing an example of translating an optimal solution in the process for adapting an existing portfolio optimizer to support valuated dependencies in one embodiment of the present disclosure.

Continuing with the example shown in FIG. 9, FIG. 10 is a diagram showing an example of translating an optimal solution in the process for adapting an existing portfolio optimizer to support valuated dependencies in one embodiment of the present disclosure. The optimizer may provide a solution that implementing elements (A, B) 1002 with element (D) 1004 would result in total cost of 7 k with total benefit response time reduction of 22 seconds. The output is then translated back to original elements, e.g., by separating the substitutive elements into individual original components. In this example, the output from the optimizer that includes substitutive elements is translated to implementing original elements A, B and D as shown at 1006, 1008 and 1010.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages, a scripting language such as Perl, VBS or similar languages, and/or functional languages such as Lisp and ML and logic-oriented languages such as Prolog. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The systems and methodologies of the present disclosure may be carried out or executed in a computer system that includes a processing unit, which houses one or more processors and/or cores, memory and other systems components (not shown expressly in the drawing) that implement a computer processing system, or computer that may execute a computer program product. The computer program product may comprise media, for example a hard disk, a compact storage medium such as a compact disc, or other storage devices, which may be read by the processing unit by any techniques known or will be known to the skilled artisan for providing the computer program product to the processing system for execution.

The computer program product may comprise all the respective features enabling the implementation of the methodology described herein, and which—when loaded in a computer system—is able to carry out the methods. Computer program, software program, program, or software, in the present context means any expression, in any language, code or notation, of a set of instructions intended to cause a system having an information processing capability to perform a particular function either directly or after either or both of the following: (a) conversion to another language, code or notation; and/or (b) reproduction in a different material form.

The computer processing system that carries out the system and method of the present disclosure may also include a display device such as a monitor or display screen for presenting output displays and providing a display through which the user may input data and interact with the processing system, for instance, in cooperation with input devices such as the keyboard and mouse device or pointing device. The computer processing system may be also connected or coupled to one or more peripheral devices such as the printer, scanner, speaker, and any other devices, directly or via remote connections. The computer processing system may be connected or coupled to one or more other processing systems such as a server, other remote computer processing system, network storage devices, via any one or more of a local Ethernet, WAN connection, Internet, etc. or via any other networking methodologies that connect different computing systems and allow them to communicate with one another. The various functionalities and modules of the systems and methods of the present disclosure may be implemented or carried out distributedly on different processing systems or on any single platform, for instance, accessing data stored locally or distributedly on the network.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Various aspects of the present disclosure may be embodied as a program, software, or computer instructions embodied in a computer or machine usable or readable medium, which causes the computer or machine to perform the steps of the method when executed on the computer, processor, and/or machine. A program storage device readable by a machine, tangibly embodying a program of instructions executable by the machine to perform various functionalities and methods described in the present disclosure is also provided.

The system and method of the present disclosure may be implemented and run on a general-purpose computer or special-purpose computer system. The computer system may be any type of known or will be known systems and may typically include a processor, memory device, a storage device, input/output devices, internal buses, and/or a communications interface for communicating with other computer systems in conjunction with communication hardware and software, etc.

The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, and/or server. A module may be a component of a device, software, program, or system that implements some "functionality", which can be embodied as software, hardware, firmware, electronic circuitry, or etc.

The embodiments described above are illustrative examples and it should not be construed that the present invention is limited to these particular embodiments. Thus, various changes and modifications may be effected by one skilled in the art without departing from the spirit or scope of the invention as defined in the appended claims.

We claim:

1. A method for adapting an existing portfolio optimizer to support one or more valuated dependencies without modifying the existing portfolio optimizer, comprising:
translating, by a processor one or more original elements and associated dependencies in a portfolio to be optimized based on said one or more valuated dependencies;
executing, by the processor, the existing portfolio optimizer with the translated one or more original elements and associated dependencies as inputs to the existing portfolio optimizer; and
translating, by the processor, optimization results obtained from the existing portfolio optimizer executed with the translated one or more original elements and associated dependencies, if said optimization results contain translated one or more original elements, into said one or more original elements,
wherein the step of translating one or more original elements comprises generating one or more substitutive elements based on said one or more original elements,
wherein the valuated dependencies comprise at least benefit dependency between said original elements and cost dependency between said original elements.

2. The method of claim 1, wherein the step of translating one or more original elements further comprises calculating measurements associated with said one or more substitutive elements based on said one or more valuated dependencies.

3. The method of claim 2, wherein the step of translating one or more original elements includes further generating one or more logical dependencies between said one or more substitutive elements.

4. The method of claim 3, wherein said one or more logical dependencies include exclude logical dependency.

5. The method of claim 4, wherein said one or more logical dependencies are generated between said substitutive elements, if said substitutive elements include one or more common constituent original elements.

6. The method of claim 3, wherein the step of translating one or more original elements further includes generating one or more logical dependencies between said one or more substitutive elements based on one or more original logical dependencies.

7. The method of claim 6, wherein said one or more logical dependencies between said substitutive elements are generated if one or more of constituent elements in said substitutive elements include said one or more original element with logical dependencies.

8. A system for adapting an existing portfolio optimizer to support one or more valuated dependencies without modifying the existing portfolio optimizer, comprising:
a processor;
a module operable to execute on the processor and further operable to translate one or more original elements and associated dependencies in a portfolio to be optimized based on said one or more valuated dependencies, the module further operable to execute the existing portfolio optimizer with the translated one or more original elements and associated dependencies as inputs to the existing portfolio optimizer, the module further operable to obtain optimization results from the existing portfolio optimizer executed with the translated one or more original elements and associated dependencies and, if said optimization results contain translated one or more original elements, translate said translated one or more original elements back into said one or more original elements,
wherein the module further comprises a substitutive element generator operable to generate one or more substitutive elements based on said one or more original elements and the valuated dependencies as said translated one or more original elements,
wherein the valuated dependencies comprise at least benefit dependency between said original elements and cost dependency between said original elements.

9. The system of claim 8, wherein the substitutive element generator is further operable calculate measurements associated with said one or more substitutive elements based on said one or more valuated dependencies.

10. The system of claim 9, wherein the module further include a logical dependency generator operable to generate one or more logical dependencies between said one or more substitutive elements and said one or more original elements.

11. The system of claim 10, wherein said one or more logical dependencies include exclude logical dependency.

12. The system of claim 11, wherein said one or more logical dependencies are generated between said substitutive elements, if said substitutive elements include one or more common constituent original elements.

13. The system of claim 10, wherein the module further include a logical dependency translator operator to generate one or more logical dependencies between said one or more substitutive elements based on one or more original logical dependencies.

14. The system of claim 13, wherein said one or more logical dependencies between said one or more substitutive elements are generated if one or more of constituent elements in said substitutive elements include said one or more original element having logical dependencies.

15. The system of claim 10, wherein the module further includes a solution translator operable to translate the optimization result that includes one or more substitutive elements into a solution that includes only one or more of said original elements.

16. A non-transitory computer readable storage medium storing a program of instructions executable by a machine to perform a method of for adapting an existing portfolio optimizer to support one or more valuated dependencies without modifying the existing portfolio optimizer, comprising:

translating, by a processor one or more original elements and associated dependencies in a portfolio to be optimized based on said one or more valuated dependencies;

executing, by the processor, the existing portfolio optimizer with the translated one or more original elements and associated dependencies as inputs to the existing portfolio optimizer; and translating, by the processor, optimization results obtained from the existing portfolio optimizer executed with the translated one or more original elements and associated dependencies, if said optimization results contain translated one or more original elements, into said one or more original elements, wherein the step of translating one or more original elements comprises generating one or more substitutive elements based on said one or more original elements, wherein the valuated dependencies comprise at least benefit dependency between said original elements and cost dependency between said original elements.

17. The computer readable storage medium of claim 16, wherein the step of translating one or more original elements includes generating one or more substitutive elements based on said one or more original elements and calculating measurements associated with said one or more substitutive elements based on said one or more valuated dependencies.

18. The computer readable storage medium of claim 17, wherein the step of translating one or more original elements includes further includes generating one or more logical dependencies between said substitutive elements.

19. The computer readable storage medium of claim 18, wherein said one or more logical dependencies include exclude logical dependency.

20. The computer readable storage medium of claim 19, wherein said one or more logical dependencies are generated between said substitutive elements, if said substitutive elements include one or more common constituent original elements.

21. The computer readable storage medium of claim 19, wherein the step of translating one or more original elements further includes generating one or more logical dependencies between said one or more substitutive elements based on one or more original logical dependencies.

22. The computer readable storage medium of claim 21, wherein said one or more logical dependencies between said substitutive elements are generated if one or more of constituent elements in said substitutive elements include said one or more original element with logical dependencies.

* * * * *